US010786751B2

(12) United States Patent
Golden et al.

(10) Patent No.: US 10,786,751 B2
(45) Date of Patent: Sep. 29, 2020

(54) COKER FRACTIONATOR SPRAY WASH CHAMBER

(71) Applicant: PROCESS CONSULTING SERVICES, INC, Houston, TX (US)

(72) Inventors: Scott William Golden, Strong, ME (US); Anthony Frederick Barletta, Jr., Houston, TX (US); Grant Joseph Niccum, Houston, TX (US)

(73) Assignee: PROCESS CONSULTING SERVICES, INC., Houston, TX (US)

( * ) Notice: Subject to any disclaimer, the term of this patent is extended or adjusted under 35 U.S.C. 154(b) by 0 days.

(21) Appl. No.: 16/403,280

(22) Filed: May 3, 2019

(65) Prior Publication Data

US 2019/0344195 A1  Nov. 14, 2019

Related U.S. Application Data

(60) Provisional application No. 62/668,695, filed on May 8, 2018.

(51) Int. Cl.
  *B01D 3/14* (2006.01)
  *C10G 7/00* (2006.01)
  *B01D 3/00* (2006.01)
  *C10B 27/00* (2006.01)

(52) U.S. Cl.
  CPC .............. *B01D 3/14* (2013.01); *B01D 3/008* (2013.01); *C10B 27/00* (2013.01); *C10G 7/00* (2013.01); *F25J 2200/90* (2013.01)

(58) Field of Classification Search
  CPC .. B01D 3/14; B01D 3/008; C10G 7/00; C10B 27/00; F25J 2200/90
  See application file for complete search history.

(56) References Cited

U.S. PATENT DOCUMENTS

| | | | | |
|---|---|---|---|---|
| 2,073,446 A | * | 3/1937 | Ellsberg | C10G 7/00 208/352 |
| 2,874,798 A | * | 2/1959 | Walker | B01D 3/18 95/213 |
| 2,973,189 A | * | 2/1961 | Chu | B01J 19/006 261/114.1 |
| 4,129,626 A | * | 12/1978 | Mellbom | B01D 3/22 261/114.1 |
| 4,661,241 A | * | 4/1987 | Dabkowski | C10B 55/00 208/107 |
| 4,776,989 A | * | 10/1988 | Harper | B01D 3/008 202/158 |
| 4,782,857 A | * | 11/1988 | Bieri | B01D 3/008 137/561 A |
| 2010/0018248 A1 | * | 1/2010 | Fieler | B01D 3/24 62/617 |

(Continued)

*Primary Examiner* — Jonathan Miller
*Assistant Examiner* — Gabriel E Gitman
(74) *Attorney, Agent, or Firm* — Patterson & Sheridan, L.L.P.

(57) ABSTRACT

A hydrocarbon distribution system is provided. The hydrocarbon distribution system has a vessel shell. A vapor distribution tray is disposed within the vessel shell. A first spray header and a second spray header are disposed above the vapor distribution tray. A draw system is disposed above the first and second spray headers. The hydrocarbon distribution system reduces clogging of nozzles, and improves product quality.

20 Claims, 6 Drawing Sheets

(56) References Cited

U.S. PATENT DOCUMENTS

| | | | |
|---|---|---|---|
| 2013/0113128 A1* | 5/2013 | Alzner | B01D 3/22 |
| | | | 261/158 |
| 2014/0183027 A1* | 7/2014 | Abouelhassan | B01D 3/166 |
| | | | 203/25 |
| 2015/0008160 A1* | 1/2015 | Anderson | B01D 3/32 |
| | | | 208/313 |
| 2016/0138863 A1* | 5/2016 | Urbanski | F25J 3/0266 |
| | | | 62/620 |

* cited by examiner

COKER FRACTIONATOR SPRAY WASH CHAMBER

CROSS-REFERENCE TO RELATED APPLICATIONS

This application claims priority to U.S. Provisional Patent Application No. 62/668,695, filed May 8, 2018, which is hereby incorporated by reference in its entirety.

BACKGROUND

Field

Embodiments of the present disclosure generally relate to an apparatus and, more specifically, a hydrocarbon distribution system.

Description of the Related Art

Delayed coking processes are used to thermally decompose heavy liquid hydrocarbons, heavy crude unit residues, or other processing unit heavy residues, into gases, liquid streams of various boiling ranges, and coke. The delayed coking process involves heating hydrocarbon liquids in a coking furnace, and transferring the heated liquids to a coking drum where the liquids decompose into coke and volatile components. In order to practically use the delayed coking process, a coker fractionation system is needed, along with the coking furnace and coking drums. The coker fractionating system separates the volatile components generated in the coking drum into various hydrocarbon streams.

In the basic delayed coking process, a liquid hydrocarbon feedstock is initially added to the bottom of a coker fractionator column where it mixes with the column bottoms liquid which is referred to as "natural recycle material." This mixture of feedstock and natural recycle material is taken from the column bottom and then pumped through furnace tubes of the coking furnace where it is heated to about 1000° F. The heated stream is then transferred to the coking drum, where the temperature and pressure are maintained at coking conditions such that the stream decomposes into coke and volatile components. The volatile components, called "coke drum vapors", are then returned to the coker fractionating system for separation into various components. Coke is a byproduct and is ideally minimized. When the coke drum becomes full of solid coke, the heated stream from the coker furnace is diverted to another coke drum and the full coke drum is cooled and emptied. The heaviest coker distillate is heavy coker gas oil (HCGO). Cokers should minimize coke formation, maximize distillates, and produce minimum contaminant heavy coker gas oil (HCGO) product. The HCGO product is processed in hydrotreater and hydrocracker units that use catalysts to improve the quality of its products. These catalysts are poisoned by the asphaltenes, solids, resins, and other contaminants that may be present in the HCGO. The result is shorter run length, higher catalyst consumption, and lower conversion, which all effect profitability.

The coker fractionating system used in the delayed coking process generally includes a fractionator column that has a flash zone into which the coke drum vapors are introduced. The vapor from the coke drum is 820-860° F. vapor, containing highly contaminated aerosols of varying size droplets. These aerosols contain non-distillable materials consisting of asphaltenes, microcarbon residue, resins, solids and other contaminants. The drum line vapor is quenched (temperature reduced by 30-60° F.) with recycled distillate or slop oil. The vapors containing aerosols and liquids resulting from the quench stream are transferred to the main column in a large diameter pipe. This material enters the flash zone, where some of the liquid is separated from the rising vapor and some of the liquid is shattered into small droplets. The vapor, aerosols, and shattered liquid rise up the column.

The vapors are fractionated by multiple trays at different locations above the flash zone. A wash zone is located immediately above the flash zone. The wash zone is typically an open area of the column with liquid wash oil spray that condenses some of the heaviest hydrocarbons and removes solid particles from the rising vapor stream. Above the wash zone, there are typically a plurality of fractionating sections and pumparound sections that are used to produce liquid hydrocarbon products from the side of the fractionator. At the top of the coker fractionator column is a vapor reflux system, in which at least a portion of the overhead vapor stream being discharged from the column is condensed and returned to the top fractionator tray. The remainder of the condensed overhead vapor stream is withdrawn as an unstabilized naphtha product.

Traditionally, two liquid streams are removed from the coker fractionating system at different points in the fractionating column. A light coker gas oil (LCGO) stream is removed from a tray near the top of the fractionator. The second stream is a heavy coker gas oil (HCGO) stream removed near the wash zone. In a conventional wash zone, a spray header (i.e. a series of branch pipes and spray nozzles coupled to a distribution pipe) distributes a wash oil into the rising column of vaporized hydrocarbon gases.

The main column wash zone is designed as a spray chamber below the HCGO section to remove some of the contaminants and minimize the entrained liquid that reaches the HCGO section. The HCGO section typically encompasses three streams. The HCGO product stream is pumped out of the unit for further processing. The HCGO pumparound stream is circulated through heat removal equipment, such as shell and tube heat exchangers or fin fan air coolers, then returned to the main column some distance above the draw. A number of trays or a section containing structured packing is used between the HCGO pumparound return and draw to facilitate heat transfer between the cooled HCGO and the rising vapors within the column to condense HCGO material for the product and wash streams. The HCGO wash stream is pumped down from the HCGO draw tray to a spray header within the wash zone below.

Any contaminants that enter the HCGO system accumulate in the system, foul or plug equipment, or leave with the HCGO product. Because the HCGO pumparound stream makes up the majority of the total HCGO rate, contaminants can concentrate in the pumparound stream unless they are purged from the pumparound loop via the wash or product streams. Purging solids via the wash stream poses a high risk of plugging the wash spray nozzles, so the HCGO product stream is the preferred route for HCGO contaminants. Because material accumulates in the system in several locations, it can periodically be purged in large amounts, resulting in rapid equipment fouling and plugging. Furthermore, large amounts of this solid material are periodically purged with the HCGO product, causing rapid downstream unit fouling. To avoid causing upsets in downstream units, it is desirable for the rate of solids and other contaminants in the product stream to be relatively constant, rather than periods of low contaminants followed by periodic "dumps" of very high contaminants in the product.

The spray chamber consists of one, two, or occasionally three spray headers, each containing several full or hollow cone spray nozzles. These nozzles create a full cone fine mist or hollow cone with the intent of removing the aerosols and minimizing contaminants entering the HCGO system. Minimizing contaminants entering the HCGO system requires proper spray header system design, correct spray nozzle selection, and the spray nozzles must not plug. The spray nozzles have small openings, typically from 0.64 cm to 1.9 cm (0.25" to 0.75"). It is common for the majority of, and sometimes all of, the nozzles to plug. One cause of nozzle plugging is sufficient solids reaching the nozzle to reduce the opening area or completely plug the nozzle. As these nozzles plug, the vapor containing aerosols have lower removal efficiency. As more aerosols enter the HCGO system, they accumulate, increasing the likelihood of plugging. Because a coker is a non-steady state unit (drums are switched on and off), it is subject to continuous operating variability. HCGO system solids can accumulate on the HCGO collector tray and other areas and then "dump" from areas of accumulation causing rapid nozzle plugging. In addition, during power outages, large amounts of accumulated solids are purged, causing rapid nozzle plugging. In addition to solids entrained from the flash zone, small amounts of solids (polymeric coke) are formed on the HCGO pumparound (PA) trays and collector tray, due to areas of very high residence time.

One problem in the art is that in wash sections with internal components, such as trays or packing, the vaporized hydrocarbon tends to form a solid, sand-like product known as coke thereon. Such coke formation can plug trays and other internal components, thereby preventing passage of the vaporized hydrocarbon or the wash oil therethrough resulting in product quality issues and low throughput. When used, frequent maintenance of the trays that requires shutdown of the tower is needed to maintain the functionality of the trays. Furthermore, these conventional designs suffer from poor "washing" of the vaporized hydrocarbon and low product yields. As such, many wash sections are devoid of trays or packing and function as spray chambers with no internal components other than the wash oil spray header(s). Finally, conventional spray chamber designs do not adequately filter the various liquid streams, which leads to plugged spray nozzles, interrupting the washing of gas streams through the fractionator.

As wash zone performance becomes worse, either HCGO contaminant levels increase, or additional wash oil flow rate is required to hold HCGO contaminants constant. As mentioned above, high HCGO contaminant levels can shorten downstream unit run length and hurt refinery profitability. Increased wash oil flow results in a higher coker unit recycle rate which decreases coker fresh feed capacity and reduces profitability. The wash oil that leaves the bottom of the wash zone into the column bottoms liquid pool is called recycle because it may be recycled back through the coker heaters to the coke drums.

Therefore, there is a need for coker systems that maximize coker wash zone effectiveness to maximize HCGO product quality and minimize wash oil flow.

SUMMARY

In one embodiment, a hydrocarbon distribution system is provided, including a vessel shell including a wash zone, a first spray header disposed in the wash zone at a first polar orientation about a central axis of the vessel shell, a second spray header disposed in the wash zone at second polar orientation about the central axis of the vessel shell, each of the first spray header and the second spray header having a plurality of spray nozzles coupled to the first spray header and the second spray header, and a draw system. The draw system includes a draw drum coupled to the vessel shell, and a plurality of particle filters. The plurality of particle filters is fluidly coupled to the draw drum.

In another embodiment, a hydrocarbon distribution system is provided, including a vessel shell including a wash zone, a first spray header disposed in the wash zone at a first polar orientation about a central axis of the vessel shell, a second spray header disposed in the wash zone at second polar orientation about the central axis of the vessel shell, each of the first spray header and the second spray header having a plurality of spray nozzles coupled to the first spray header and the second spray header, and a vapor distribution tray disposed in the vessel shell. The vapor distribution tray is configured to radially distribute a vapor passing through the vapor distribution tray.

In another embodiment, a hydrocarbon distribution system is provided, including a vessel shell including a wash zone, a vapor distribution tray disposed in the vessel shell, a first spray header disposed in the wash zone at a first polar orientation about a central axis of the vessel shell, a second spray header disposed in the wash zone at second polar orientation about the central axis of the vessel shell, each of the first spray header and the second spray header having a plurality of spray nozzles coupled to the first spray header and the second spray header, and a draw system fluidly coupled to the first spray header and the second spray header. The draw system includes a draw drum that is fluidly coupled to the vessel shell, and a plurality of particle filters. The vapor distribution tray is configured to radially distribute a vapor passing through the vapor distribution tray. The plurality of particle filters is fluidly coupled to the draw drum.

A variety of hydrocarbon distribution systems are provided that can be used in a coker fractionator. The hydrocarbon distribution systems allow for more thorough distribution of vapors and liquids, prevents sold buildup in nozzles in the system, and prevents solid buildups on various collector trays in the system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to an apparatus for delivering liquids, including hydrocarbons. The apparatus includes a variety of chambers, such as a vessel shell and a draw drum, and also includes a variety of pipes or lines fluidly coupleable to one another. The arrangement of spray nozzles in the coker fractionator results in more interaction between the sprayed wash oil and the vapors, removing impurities from the vapors. The inclusion of a vapor distributor tray improves vapor distribution in the wash zone. The liquid draw system includes a draw drum and filters that filter solids from liquids flowing through the pipes and lines, preventing nozzle clogging. Embodiments of the present disclosure may be useful for, but are not limited to, maximizing wash zone performance in a coker fractionator.

Figure 1:
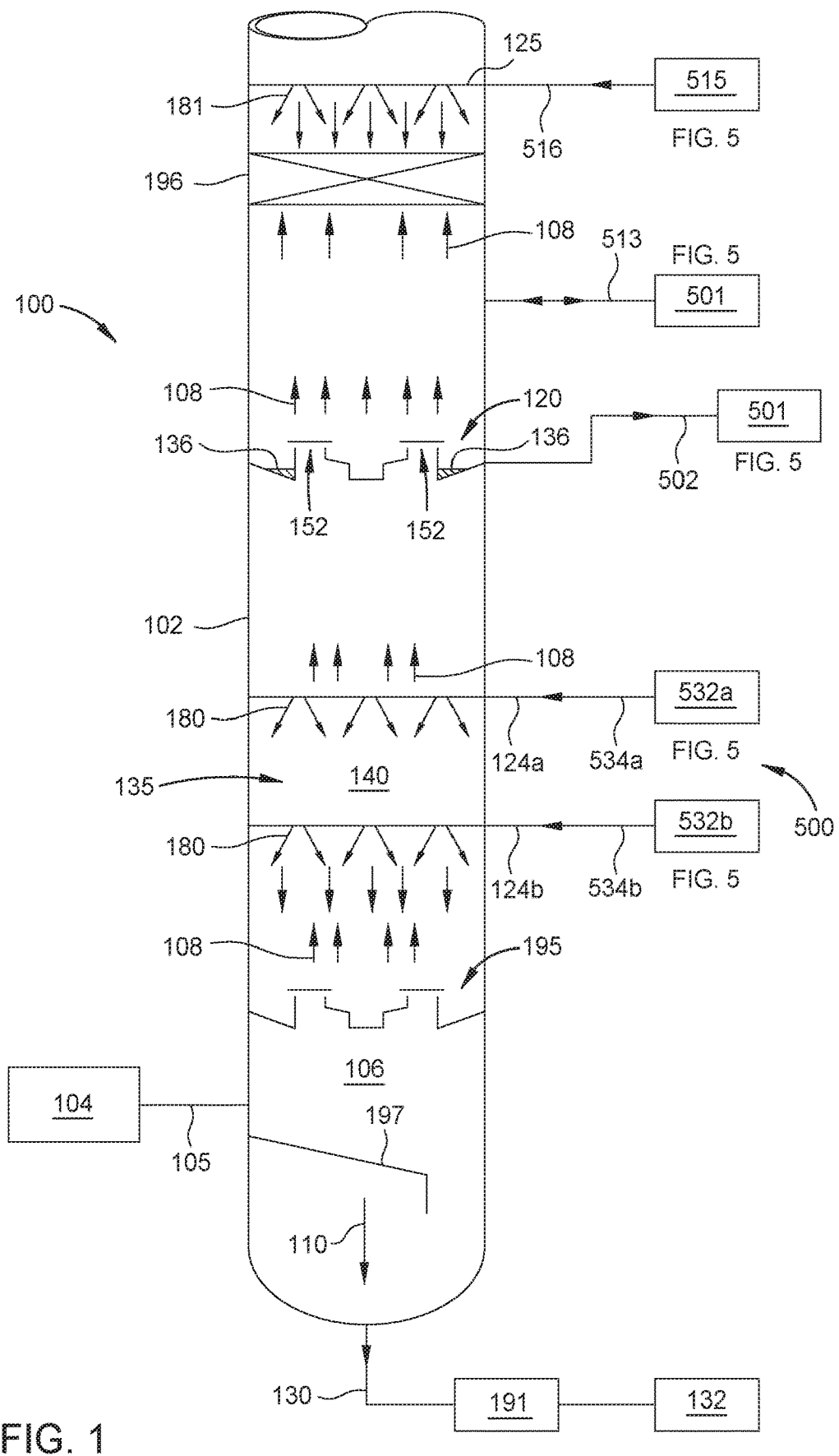
FIG. 1 illustrates a schematic arrangement of a fractionation column, according to one embodiment.
Figure 5:
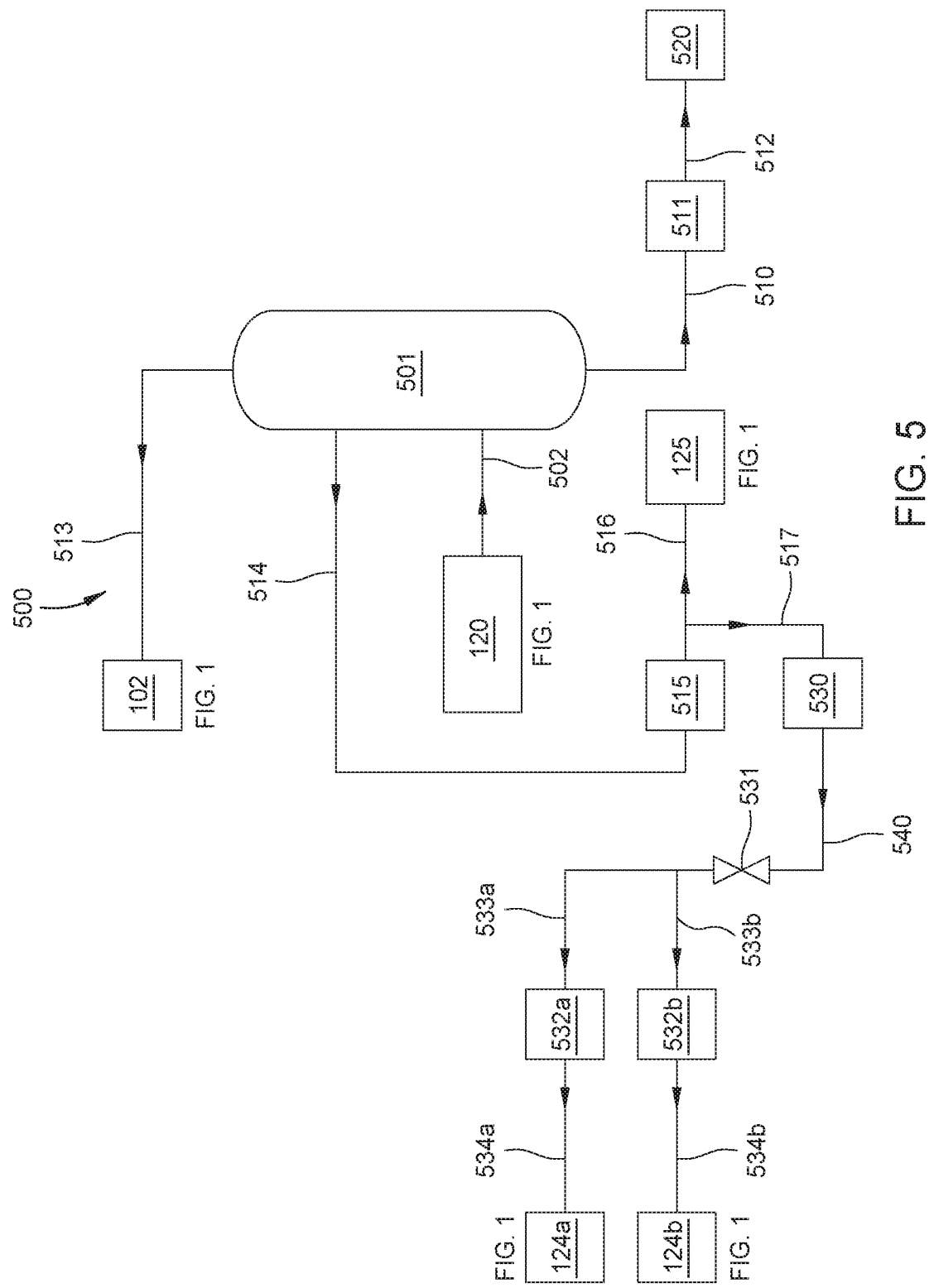
FIG. 5 illustrates a draw system, according to one embodiment.

FIG. 1 illustrates a schematic view of a portion of a coker fractionator 100, according to one embodiment. The fractionator 100 has a vessel shell 102 for containing a process therein. As shown, the vessel shell 102 includes a hydrocarbon distribution system 135, a flash zone 106, a heat shield 197, and a wash zone 140. As shown, the hydrocarbon distribution system 135 includes one or more spray headers 124a, 124b, 125, a vapor distribution tray (VDT) 195, a collector tray 120, a packed pumparound bed 196, and a draw system 500 (FIG. 5). Each spray header 124a, 124b, 125 has a plurality of spray nozzles 180, 181, such as four or more spray nozzles. More details about the spray headers 124a, 124b, are described below in FIGS. 2A, 2B, and 3. It is to be noted that only a portion of the coker fractionator 100 is illustrated in FIG. 1. Other internal components, such as additional spray headers, trays, or vortex breakers, among others, can be included in the vessel shell 102.

A hydrocarbon feed 104 provides a heated hydrocarbon through a feed line 105 to the vessel shell 102 at a flash zone 106 of the coker fractionator 100. The heated hydrocarbon can include, for example, volatile coke drum vapors and crude residual. Upon entry into the flash zone 106, a vapor portion of the heated hydrocarbon separates from a liquid (or even slurry) portion. The lighter vapor portion (also referred to herein as vapor) rises upward, represented by arrows 108. Meanwhile, the heavier liquid portion, represented by arrow 110, descends towards a lower end of the vessel shell 102. The liquid portion is removed from the fractionator 100 through a bottoms outlet 130. The liquid portion is pumped via a bottoms pump 191 to block 132. The unvaporized liquid portion is sent for further processing, represented by block 132, such as recycled for further heating and circulation through the coker unit or further processing at a different location. For example, the liquid portion can be filtered for solids, and returned to the bottom of the vessel shell 102 for recycling to coke drums, the coke drums represented by block 132.

The heat shield 197 protects the liquid collected in the bottom of the vessel shell 102 from the hot coke drum vapor. The recycled liquid flows down to the bottoms outlet 130. The heat shield 197 can be a baffle.

The VDT 195 includes a plurality of openings 150, according to one embodiment. The plurality of openings 150 can each have a riser hat 151, and the riser hats cover the openings to prevent liquid from above from falling through the openings, thus bypassing the VDT 195. The liquid falling from above lands on the riser hats 151 and then drains off onto the deck of the VDT 195, allowing the liquid to be collected on the VDT and drawn off.

The vapor has a highly disorganized and uneven distribution within the flash zone 106 as the vapor rises towards the VDT 195. For example, the vapor has a varying velocity across the cross-sectional area of the flash zone 106. The VDT 195 radially distributes and increases uniformity of the vapor passing through the VDT 195 by reducing the flow area available to the vapor for passing through the VDT 195. The VDT 195 has an open flow area 153 for the vapor that is less than 20% of the cross-sectional flow area of the vessel shell 102 (referred to as the shell flow area), such as less than 18% of the shell flow area, for example, 15% of the shell flow area, according to one embodiment. The open flow area 153 is an open portion of the VDT 195, such as the one or more openings 150.

By reducing the open flow area 153 of the VDT 195, the vapor undergoes a large pressure drop across the VDT 195 which creates a backpressure on the rising vapor below the VDT 195. Additionally, the velocity of the vapor through the openings 150 is increased. Therefore, the disorganized flow of the vapor below the tray is substantially reduced and thus becomes more uniform as the vapor passes through, and exits, the VDT 195. Conventional tray designs utilize an open flow area of about 25% or even greater in order to minimize backpressure on the rising vapor. However, the inventors have discovered that increasing the backpressure on the rising vapor significantly improves uniformity of the distribution of the vapor passing through the VDT 195, resulting in improved product quality, as described below.

The VDT 195 utilizes an increased number of openings 150 to achieve the open flow area 153 discussed above, compared to conventional tray designs. That is, an increased number of openings 150, each having a smaller open area compared to conventional trays, are used. Immediately above the VDT 195, the vapor has areas of higher velocity above the openings 150 and areas of lower velocity where the VDT 195 impedes flow. The velocity distribution of the rising vapor normalizes as the vapor moves higher into the wash zone 140. By utilizing more openings 150, the velocity distribution of the rising vapor normalizes much more quickly than conventional tray designs using fewer openings 150. The velocity distribution is improved lower in the wash zone 140, since the increased number of openings 150 reduces the variations in areas of higher velocity and lower velocity immediately above the VDT 195.

The increased velocity created by the reduced flow area also reduces coke formation onto the VDT 195. The vapor rising through the openings 150 can condense on an inner surface of the openings 150. When the velocity of the rising vapor is low, the condensed liquid on the surface of the opening 150 can be held in equilibrium between the downward force of gravity and the upward shear force applied by the rising vapor. The residence time of the condensed liquid can cause coke to form in the opening 150. However, the reduced flow area and the sizing of the openings 150 described herein create sufficient velocity of the vapor to generate a shear force capable of overcoming the gravitational force applied to the condensed liquid. The increased velocity carries the liquid upward through the opening 150 and into the wash zone 140 thus preventing coke formation. The Souders-Brown C-factor ($C_f$) is a design factor commonly used in the design of fractionation vessels. Here, the openings 150 are sized so that a fluid therein has a $C_f$ of greater than about 0.6 m/s (2 ft/s).

Figure 4A:
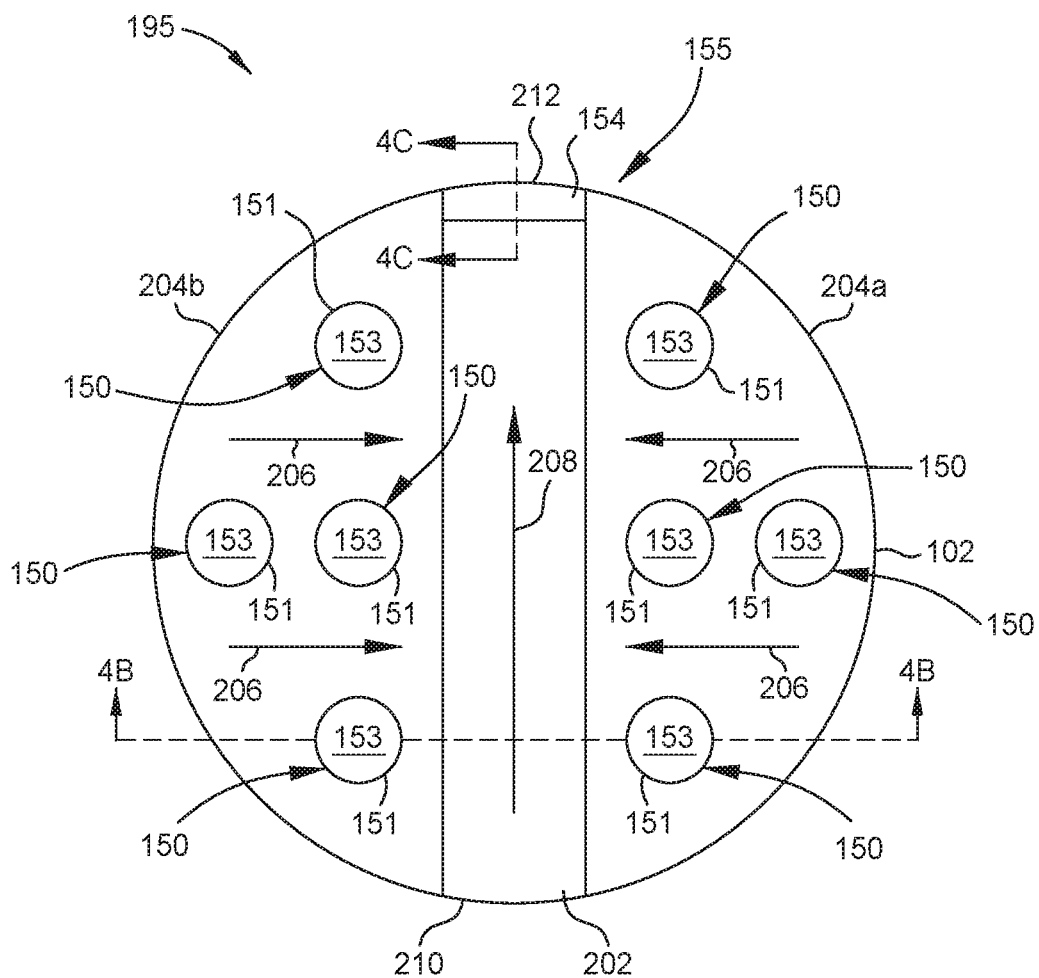
FIG. 4A illustrates a plan view of a collector tray, according to one embodiment.

FIG. 4A illustrates a plan view of the VDT 195, according to one embodiment. Here, the VDT 195 has representatively eight openings 150 formed therethrough. A sump 202 is formed in the VDT 195 between two sloped portions 204a, 204b, according to one embodiment. The openings 150 are disposed in the sloped portions 204a, 204b.

Figure 4B:
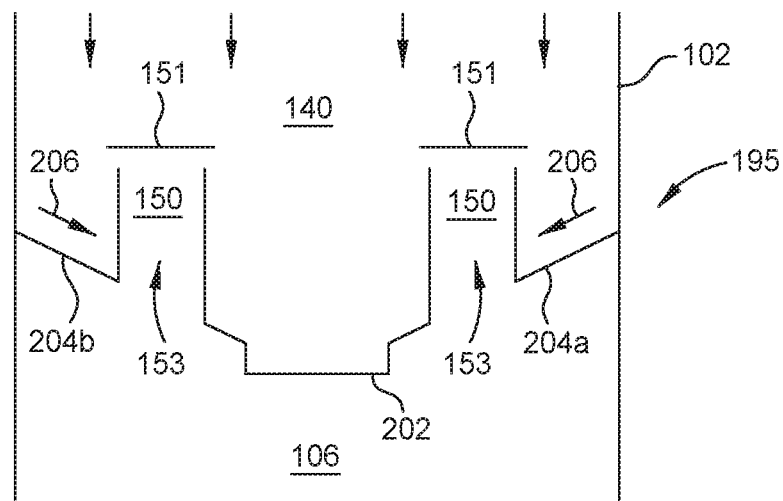
FIGS. 4B and 4C illustrate sections of portions of the collector tray of FIG. 4A, according to one embodiment.

FIG. 4B illustrates sections of portions of the VDT 195 of FIG. 4A, according to one embodiment. As shown in FIG. 4B, the sloped portions 204a, 204b are angled downward from the wash zone 140 to the flash zone 106 towards the sump 202, according to one embodiment. Thus, the wash oil collected on the sloped portions 204a, 204b of the VDT 195 flows towards the sump 202 as indicated by arrows 206. The sump 202 also has a slope from a first end 210 to a second end 212. The drain 154 is disposed at the second end 212 of the sump 202, according to one embodiment. The liquid collected within the sump 202 flows towards the drain 154 at the second end 212 as indicated by arrow 208. The sump 202 is not limited to a central location of the VDT 195. In alternative embodiments, the sump 202 can be disposed at an edge of the VDT 195, or multiple sumps can be used.

The collected liquid can form coke on the VDT 195 due to flow stagnation and long residence time thereon. The slope of sloped portions 204a, 204b can be from about 0.042 to about 0.125 (about 0.5 in/ft to 1.5 in/ft), corresponding to an angle of about 2.4° to about 7.1°, and the slope is selected to reduce the residence time and prevent stagnation of the collected wash oil on the VDT 195. Similarly, the slope of the sump 202 is sufficient to quickly move the collected liquid to the drain 154 at the second end 212, thereby preventing coke formation. Additionally, the shape and layout of the openings 150 are selected to prevent stagnation of the collected liquid on the VDT 195. In one example, risers having a circular cross-section, as shown in FIG. 4A, are used for the openings 150, since the round shape does not cause the collected liquid to stagnate during flow towards the sump 202. In another example, risers having a square or rectangular cross-section are used for the openings 150. In such cases, the openings 150 are rotated such that a flat surface is not facing "uphill" (i.e., facing the upward slope away from the sump 202) or normal to the flow of the collected liquid since such flat surfaces can impede the flow and increase residence time of the liquid. Sloping the tray also increases the velocity of liquid flowing across the tray, allowing it to sweep any solid materials that settle onto the tray to the sump 202 and then out the drain 154.

The bottom side (i.e., facing the flash zone 106) of the VDT 195 is also designed to prevent coke formation. The rising vapor below the VDT 195 can condense on the bottom side to form droplets of hydrocarbon liquid with high surface tension. The high surface tension and increased collection of the droplets on the bottom side of the VDT 195 increase the residence time of the droplets thereon. The VDT 195 is insulated to maintain a sufficient temperature to prevent the rising vapor from condensing on the bottom side thereof. The VDT 195 can be coated with a refractory material, such as a castable refractory, to provide the insulation. Further, the bottom side of the VDT 195 is free from protrusions or other items, such as support beams, which inhibit flow and increase residence of a condensed liquid and promote coke formation. Rather, the beams for supporting the VDT 195 are disposed on the top side (i.e., facing the wash zone 140) where coke formation is less likely.

Figure 4C:
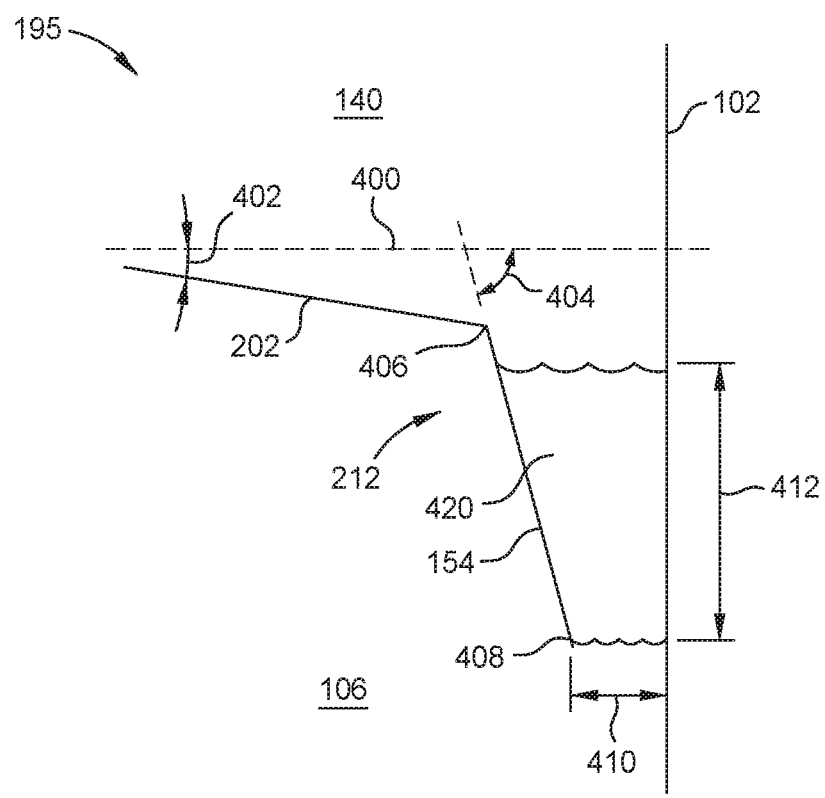

FIG. 4C illustrates a section of the VDT 195, showing the drain 154, according to one embodiment. In conventional tray designs, a seal pan is used to prevent flow of the rising vapor through the drain 154. However, such seal pans are prone to coke formation due to the stagnation and residence time of the liquid thereon. Seal pans are also low points that tend to collect solid materials, which can plug the seal pan and lead to tray flooding. The drain 154 is formed in the sump 202 of the VDT 195, the drain having a sloped portion configured to form a liquid seal 420 therein, according to one embodiment. The angle 402 is measured between the sump 202 and a horizontal datum 400, and the angle 402 can vary from about 2.4° to about 7.1°. Similarly, an angle 404 is measured between the drain 154 and the horizontal datum 400, and angle 404 can vary from about 60° to about 85°. The angles 402, 404 measure the slope of the sump 202 and the drain 154, respectively. The slope of the sump 202 carries liquid towards the drain 154. The angle 404 is selected so that the drain 154 slopes from a first end 406 to a second end 408 towards the vessel shell 102, so that a gap 410 is formed at the second end 408.

The gap 410 is sized such that liquid collected by the sump 202 builds a level within the drain 154 to form the seal 420. The seal 420 has a sufficient height 412, so that the pressure created by the liquid prevents the rising vapor below the VDT 195 from passing through the drain 154 to the wash zone 140. The rate of liquid flow is high enough that the liquid builds the liquid seal 420 in the gap 410 in order to push the required rate of liquid out of the second end 408. The gap 410 is sized such that the liquid rate through the drain 154 is from about 102 mm/s to about 204 mm/s (about 150 gal/(min*ft$^2$) to about 300 gal/(min*ft$^2$)). The gap 410 is sufficiently small to build the level within the drain 154, but large enough to allow the collected liquid to pass from the drain 154 into the flash zone 106 without forming coke therein. As shown, the angle 404 is substantially large compared to the angle 402, so that the drain 154 is highly sloped. The large slope of the drain 154 reduces the cross-section thereof and thus the volume of liquid needed to form the seal 420. Thus, the residence time of the liquid with the drain 154 is reduced, which prevents coke formation therein. The liquid seal 420 is dynamic, in that new liquid flows through the gap 410 to continuously refresh the liquid of the seal.

The wash oil descends through the rising vapor and is collected on an upper surface of the VDT 195 (i.e., facing the wash zone 140). A drain 154 is formed in the VDT 195 to remove the collected wash oil. The drain 154 is designed to allow passage of the wash oil and collected material, such as coke and other impurities, therethrough without becoming lodged in the drain 154. The collected wash oil is passed through the drain 154 to the flash zone 106 wherein the wash oil is joined with the feed and the liquid portion of the heated hydrocarbon for removal by the bottoms outlet 130. As discussed above, the flow of the vapor below the VDT 195 is highly disorganized and non-uniform. In certain cases, the disorganized flow of the vapor within the flash zone 106 can adversely affect the flow of the collected wash oil through the drain 154 due to the fluid communication between the drain 154 and the vapor. High velocity vapor below the VDT 195 can shear liquid drained into the flash zone 106 into droplets, which become entrained with the rising vapor and are reintroduced as contaminants in the wash zone 140. The drain 154 is located in an area of the VDT 195 which corresponds to a low velocity region 155 of the rising vapor below, according to one embodiment. The placement of the drain 154 in this matter improves the functionality of the drain 154 and decreases entrainment and reintroduction of the collected wash oil from the flash zone 106 into the wash zone 140, making more room for fresh hydrocarbons from the hydrocarbon feed 104.

Next, the vapor enters a wash zone 140 of the vessel shell 102. The spray headers 124a, 124b are disposed in the wash zone 140 above the VDT 195. The spray headers 124a, 124b inject a mist of hydrocarbons called wash oil. The wash oil, represented by downward arrows, flows downward in the wash zone 140 in a direction opposing the direction of the rising vapor. The upward flow of the vapor passes droplets of the wash oil to promote interaction between the two fluids. The downward flowing wash oil interacts with the rising vapor inducing heat and mass transfer between the fluids which removes product impurities and other defects in the vapor stream and lowers the temperature of the rising vapor. The wash oil is supplied via wash oil pipes 534a, 534b, which are connected to secondary particle filters 532a, 532b, which are described in more detail below.

Figure 2A:
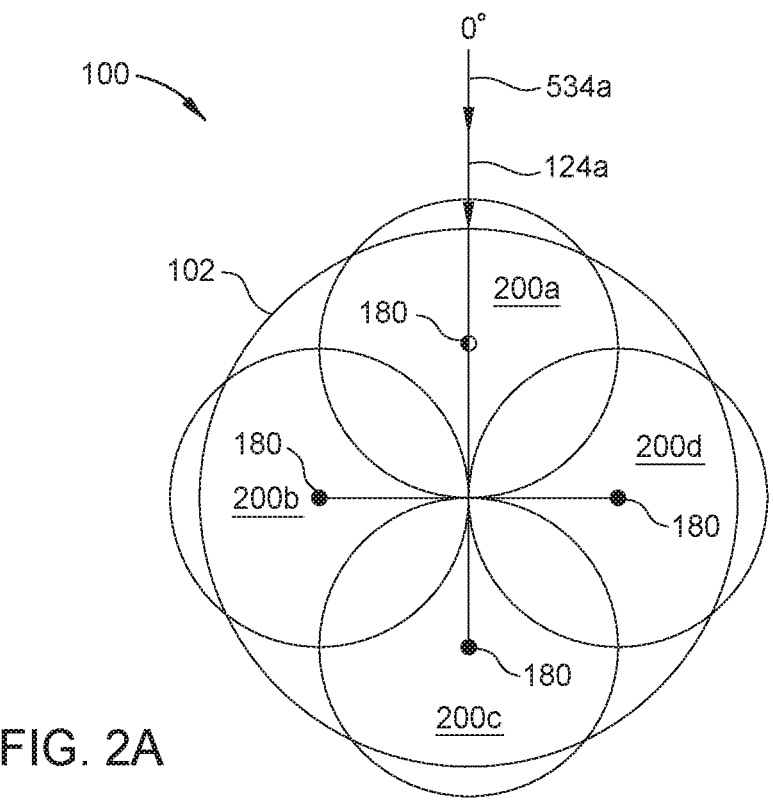
FIGS. 2A and 2B illustrate plan views of spray header arrangements, according to one embodiment.
Figure 2B:
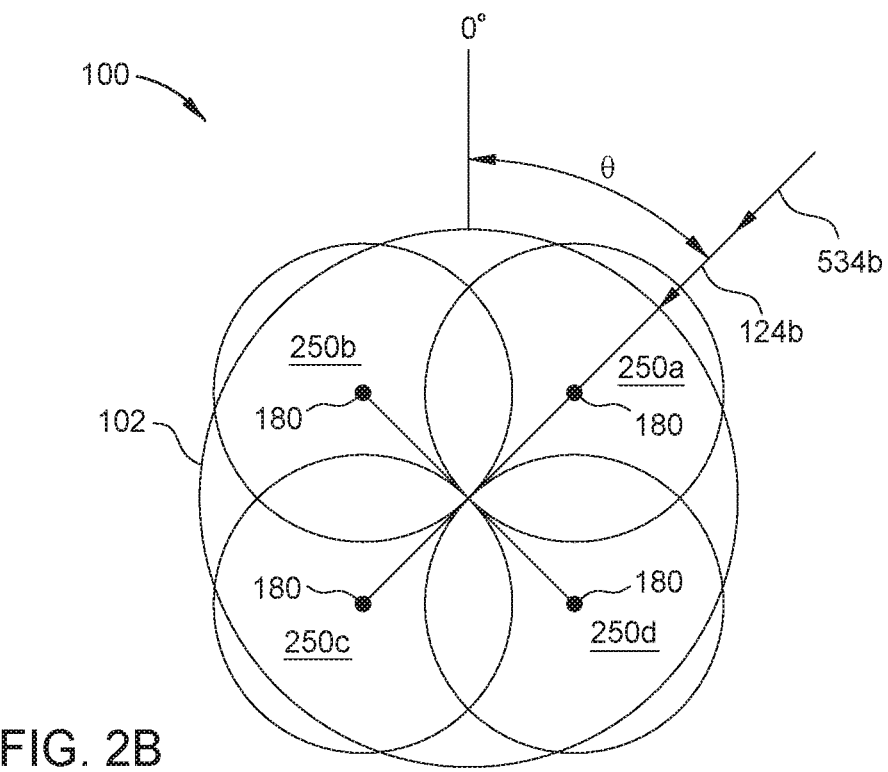

FIG. 2A is a top down plan view of an exemplary orientation of the first spray header 124a, according to one embodiment. FIG. 2B is a top down plan view of the exemplary orientation of the second spray header 124b, according to one embodiment. As illustrated, the orientation of the first spray header 124a and the orientation of the second spray header 124b are offset by an angle θ to improve the distribution of the wash oil across the wash zone 140. The effectiveness of the washing of the rising vapor is largely affected by distribution of the rising vapor and the wash oil in the wash zone 140. Here, the first spray header 124a has four spray nozzles 180 which produce spray patterns 200a, 200b, 200c, 200d, which are represented by circles. In this embodiment, the first spray header 124a is oriented at a representative orientation of 0 degrees. Similarly, the second spray header 124b also has four spray nozzles 180 which produce spray patterns 250a, 250b, 250c, 250d, which are represented by circles. Here, the second spray header 124b is oriented at the angle θ from the 0 degree orientation of the first spray header 124a. That is, the second spray header 124b has a polar orientation in relation to a central axis of the vessel shell 102 that is different than a polar orientation of the first spray header 124a about the central axis. Therefore, the spray patterns 200a, 200b, 200c, 200d of spray header 124a partially overlap with spray patterns 250a, 250d, 250c, 250d of spray header 124, but do not completely align, thus increasing the coverage of the spray pattern across the cross-sectional area of the vessel shell 102 and minimizing dead zones in the cross-sectional area, according to one embodiment. The supports of the spray headers 124a, 124b are designed to drain, and prevent coke formation on the supports.

Figure 3:
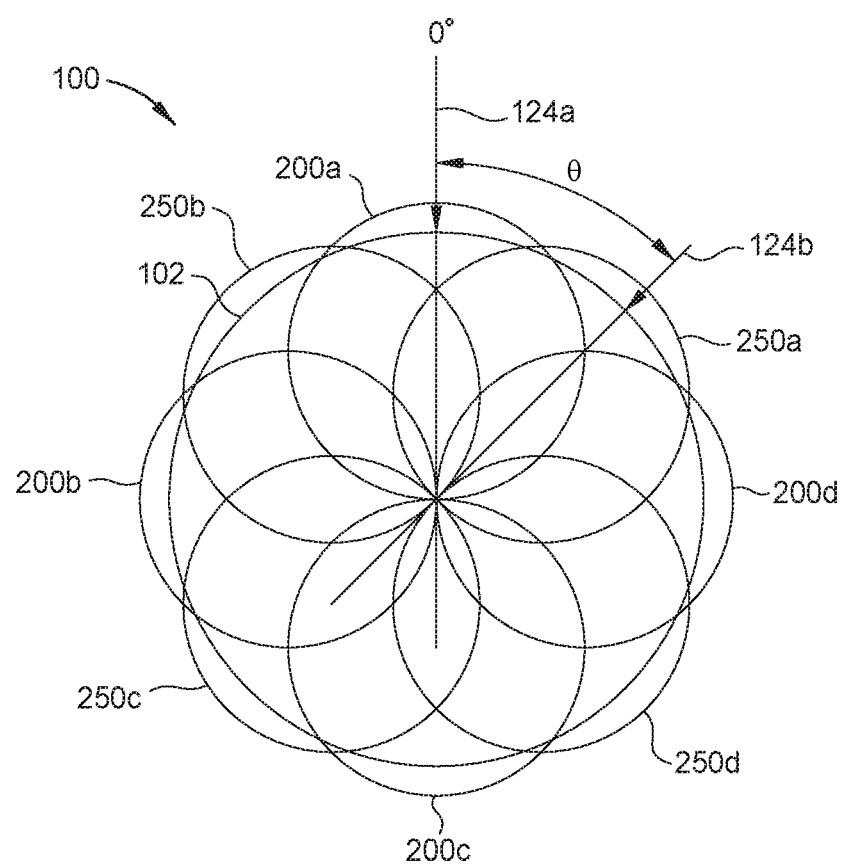
FIG. 3 illustrates a plan view of a spray pattern of an arrangement of the spray headers of FIGS. 2A and 2B, according to one embodiment.

FIG. 3 illustrates a plan view of a spray pattern of an arrangement of the spray headers 124a,124b of FIGS. 2A and 2B, according to one embodiment. The angle θ is between about 5 degrees and about 85 degrees, such as between about 30 degrees and about 60 degrees, for example, about 45 degrees, according to one embodiment. The angle θ is selected to maximize the coverage of the spray patterns 200a, 200b, 200c, 200d and the spray patterns 250a, 250b, 250c, 250d, according to one embodiment. By increasing the distribution of the wash oil across the shell area, the washing of the rising vapor is greatly improved, thus improving product quality and throughput of the coker fractionator 100.

The spray headers 124a, 124b are designed to minimize the formation of coke thereon and therein which can adversely affect the distribution of the wash oil. Dead legs (i.e., locations in the pipe where fluid flow is stagnant) are eliminated by terminating the branches of the spray headers 124a, 124b with nozzles instead of cap plates. Further, the diameter of the wash oil pipes 534a, 534b is intermittently reduced over the length thereof to maintain velocity of the fluid therein as a portion of the liquid volume is removed at each branch connection and spray nozzle 180 location, according to one embodiment. The supports for the spray headers 124a, 124b are also designed to prevent stagnation of liquid that condenses within the wash zone 140. For example, the supports can be rounded or capped to allow liquid flow therefrom thus preventing coke formation caused by high residence time thereon.

It is understood the spray headers 124a, 124b can be oriented as desired to increase the spray pattern coverage of the wash oil. Although four spray nozzles 180 are utilized with each spray header 124a, 124b, other numbers and orientations of spray nozzles 180 can be utilized. Still further, other numbers of spray headers, such as one or three or even more, can be utilized.

If the spray nozzles on spray headers 124a, 124b become plugged, wash zone performance deteriorates, meaning that either more contaminants reach the collector tray 120, or that more wash oil flow is required to hold HCGO contaminants constant. Lower HCGO quality or higher wash rate adversely affect unit profitability, so avoiding wash spray nozzle plugging is critical to profitable and reliable long-term operation of the coker fractionator.

After passing through the wash zone 140, the rising vapor reaches the collector tray 120. The collector tray 120 is, for example, a chimney tray, a sieve tray, a valve tray, or other tray type capable of collecting a liquid thereon, according to some embodiments. The collector tray 120 may be substantially similar to the VDT 195. After passing through the collector tray 120, a portion of the vapor is condensed to form a liquid product 136 which is collected by the collector tray 120. The condensed liquid product 136 is commonly referred to as heavy coker gas oil. The condensed liquid product 136 typically contains a variety of hydrocarbons with a true boiling point (TBP) of about 600° F. to about 1050° F. The liquid product 136 is removed from the collector tray 120 via a draw line 502 which is used to transport the liquid product to a draw drum 501 (FIG. 5).

The collector tray 120 modulates the flow of the rising vapor below in the wash zone 140. That is, similar to the VDT 195, the collector tray 120 has a reduced flow area that creates a backpressure onto the rising vapor. The collector tray 120 has openings 152 therein, similar to the openings 150, which allow passage of the rising vapor from the wash zone below the collector tray 120 to a volume above the collector tray 120. The openings 152 optionally include vapor control devices, such as risers, caps, or valves, among others, which can direct a flow direction or velocity of a vapor passing through the opening 152. The collector tray 120 and the openings 152 are designed to provide a desired backpressure and velocity of the rising vapor. The collector tray 120 and the VDT 195 can be designed to function in concert to achieve a desired distribution and velocity of the rising vapor. That is, the trays 195, 120 are designed with respect to one another and function in unison so that interaction with the rising vapor therebetween results in a desired distribution of the vapor. The designed interaction between the collector tray 120 and the VDT 195 provides increased uniformity of the vapor distribution over conventional tray designs, which do not contemplate such an interaction between two trays.

Above the collector tray 120, a structured packing material is disposed in the vessel shell 102 to form the packed pumparound bed 196. The packed pumparound bed 196 promotes heat and mass transfer between the rising vapor and falling HCGO pumparound liquid. The structured packing material can include corrugated sheet metal. A packed bed, rather than trays, is used in this section because it provides a uniform, well-distributed liquid flow out of the bottom of the packed bed onto collector tray 120. This uniformly distributed liquid flows across all parts of collector tray 120, which eliminates stagnant areas and sweeps any solid material toward the draw line 502. Where trays are used for the pumparound section, tray downcomers dictate that all of the liquid is dumped onto discrete sections of the collector tray 120, which would result in stagnant regions that could accumulate solid materials. By sloping and continually sweeping the collector tray 120 with liquid, large areas of solids cannot accumulate, which could dump unexpectedly and foul downstream equipment and wash spray nozzles.

A spray header 125 is disposed above the packed pumparound bed 196. The spray header 125 injects a mist of a hydrocarbon called heavy coker gas oil (HCGO) onto the top of packed pumparound bed 196. The upward flow of the vapor passes the subcooled HCGO liquid to promote interaction between the two fluids. The downward flowing HCGO interacts with the rising vapor inducing heat and mass transfer between the fluids which condenses HCGO in the vapor stream and lowers the temperature of the rising vapor. The HCGO is supplied via a pumparound line 516, which is pumped from the draw drum 501 (FIG. 5).

FIG. 5 illustrates a draw system 500, according to one embodiment. In some embodiments, after the liquid product 136 is removed from the collector tray 120 via the draw line 502, at least a portion of the liquid product is further processed in the draw system 500. As shown, the draw system 500 includes the draw drum 501, vent line 513, draw line 502, product pump line 510, product pump 511, product line 512, pumparound wash line 514, pumparound wash pump 515, pumparound line 516, wash line 517, particle filters 530, 532*a*, 532*b*, secondary filter line 540, control valve 531, filter split lines 533*a*, 533*b*, and wash oil pipes 534*a*, 534*b*. Although only one control valve 531 is shown in FIG. 5, it is to be understood that additional valves can be placed at any necessary portions of the draw system 500 in order to control the flow of fluid in the draw system 500. The diameter of any elements of the draw system 500 can be intermittently reduced over the length of the element thereof to maintain velocity of the fluid therein as a portion of the liquid volume is removed at each branch connection. For example, as the pipe from pumparound wash pump 515 splits into pumparound line 516 and wash line 517, the diameters of the pumparound line and wash line can be reduced to maintain liquid velocity.

Collected liquid from collector tray 120 is supplied to the draw drum 501 by the draw line 502. A portion of the HCGO is supplied to the product pump 511 via the product pump line 510, according to one embodiment. The product pump 511 pumps the HCGO through the product line 512 to the destination 520, where the HCGO is transferred for further processing.

The draw drum 501 is configured to partition heavy solid materials in the liquid into the product pump line 510. In one embodiment, the partitioning is accomplished by gravity, but other means are contemplated. By placing the product pump line 510 at the bottom of the draw drum 501 and the pumparound wash line 514 above the draw line 502, and sizing the draw drum large enough that the velocity therein is low enough for solid particles to settle, the solids settle by gravity toward the product pump line 510 at the bottom of the drum rather than moving against gravity to escape through the pumparound wash line 514. Internal components could be added to draw drum 501 to assist with the partitioning of the solids by using centrifugal force in addition to gravity, for example.

The pumparound and wash portions of the collected liquid exit the draw drum 501 through pumparound wash line 514 by the pumparound wash pump 515. The pumparound wash line 514 is located higher in the draw drum 501 than the product line 512 to partition the heavier solid materials into the product pump line 510. The pumparound wash pump 515 pumps HCGO pumparound through the pumparound line 516, which is flowed back to the spray header 125, where the HCGO is recycled and reused in the vessel shell 102, according to one embodiment. In addition, the pumparound wash pump 515 pumps wash liquid through the wash line 517, where the liquid flows through the primary particle filter 530, according to one embodiment. The primary particle filter 530 filters particles with a radius larger than about d/4, where d is the radius of the spray nozzles 180, 181, according to one embodiment. The filtering of particles of this size prevent blockage of the spray nozzles 180, 181. For example, the primary particle filter 530 filters particles above an approximate maximum size of about 0.16 cm to about 0.64 cm (about 1/16 in to about 1/4 in). The primary particle filter 530 can be a basket-type strainer.

Vent line 513 is provided at the top of the draw drum 501 to equalize the draw drum 501 pressure with the pressure in the coker fractionator 100. The vent line 513 is full of vapor and fluidly couples the draw drum 501 to the coker fractionator 100 above the HCGO draw tray. Although FIG. 1 shows the vent line 513 entry point located below the packed pumparound bed 196, the vent line entry point can be located above the packed pumparound bed material 196 and below the spray header 125, or above the spray header 125.

The filtered liquid from primary particle filter 530 flows through the secondary filter line 540, and the further progress of the filtered liquid is controlled by the control valve 531. After the control valve 531, the filtered liquid flows through the filter split lines 533*a*, 533*b*, where the filtered liquid is filtered by secondary particle filters 532*a*, 532*b*, according to one embodiment. The secondary particle filters 532*a*, 532*b* filter particles with a radius larger than about d/4, where d is the free passage of the spray nozzles 180, 181, according to one embodiment. The filtering of particles of this size prevent blockage of the spray nozzles 180, 181. For example, the secondary particle filters 532*a*, 532*b* filter particles above an approximate maximum size of about 0.16 cm to about 0.64 cm (about 1/16 in to about 1/4 in). The secondary particle filters 532*a*, 532*b* can be wye-type strainers. Finally, the filtered wash liquids are sprayed through the spray headers 124*a*, 124*b*. The secondary particle filters 532*a*, 532*b* are disposed close to the spray headers 124*a*, 124*b* to catch any solids found downstream of the primary particle filter 530; for example, solids can form after the primary particle filter, but before the secondary particle filters. Although two secondary particle filters 532*a*, 532*b* are shown, it is contemplated that any number of secondary particle filters 532 could be used, in conjunction with the appropriate amount of spray headers 124*a*, 124*b*.

The spray headers 124*a*, 124*b*, with spray patterns 200*a*, 200*b*, 200*c*, 200*d*, 250*a*, 250*b*, 250*c*, 250*d* herein can be used to modify any existing coker fractionator 100. The VDT 195 and the spray headers 124*a*, 124*b* can be used in tandem.

As shown above, by utilizing the embodiments described herein, the product quality and throughput of a coker fractionator is substantially increased. In one embodiment, the vapor distribution device having a reduced flow area increases the uniformity of the distribution of the vapor passing therethrough. Additionally, the velocity of the heated hydrocarbon vapor is increased through the vapor distribution device minimizing the formation of coke. By staggering or offsetting the orientation of the spray headers 124 as described herein, the uniformity of the distribution of the wash oil is increased which further improves washing of the rising vapor. The distribution of the wash oil and the hydrocarbon vapor is further increased by designing the trays 195, 120 to function in tandem. The embodiments herein advantageously promote improved product quality in a coker fractionator. By increasing the uniformity of the distribution of the vapor and the wash oil in the wash zone 140, washing of the vapor is greatly increased, and so too is the reliability of the wash zone.

Embodiments of the disclosure herein maximize wash zone performance, minimize likelihood of nozzle plugging and prevent solid accumulation in the HCGO system. The system as disclosed also minimizes the formation of solids. The features discussed here improve vapor/liquid contacting in the wash zone, reduce nozzle pluggage throughout the run of the coker fractionator, at least partially prevent the accumulation of solid materials in the coker fractionator, and purge the solids from the coker fractionator. By preventing nozzle plugging, the spray chamber aerosol removal efficiency is increased throughout the run. The draw system is designed and operated to reduce oil residence time, reduce polymeric coke, reduce accumulation of solids, and purge solid material. The draw system is designed to preferentially remove the small amount of solids that could accumulate daily, so that typical operating unit upsets and power outages do not cause large solid "dumps" which plug the spray nozzles and other equipment.

It is to be understood that while the embodiments herein are describe in relation to a coker fractionator, other distillation or fractionation processes can benefit from the disclosure.

While the foregoing is directed to embodiments of the present disclosure, other and further embodiments of the disclosure may be devised without departing from the basic scope thereof, and the scope thereof is determined by the claims that follow.

What is claimed is:

1. A hydrocarbon distribution system, comprising:
   a vessel shell, comprising:
      a wash zone;
      a collector tray disposed above the wash zone;
      a packed pumparound bed disposed above the collector tray;
      a first spray header disposed in the wash zone at a first polar orientation about a central axis of the vessel shell;
      a second spray header disposed in the wash zone at second polar orientation about the central axis of the vessel shell, each of the first spray header and the second spray header having a plurality of spray nozzles coupled thereto, the first and second spray headers configured to uniformly distribute wash oil across the wash zone; and
      a third spray header disposed above the packed pumparound bed and having a plurality of spray nozzles coupled thereto; and
   a draw system, comprising:
      a draw drum in fluid communication with the vessel shell via a draw line that is configured to supply liquid collected in the collector tray to the draw drum, the draw drum being in fluid communication with the first and second spray headers via a plurality of wash oil pipes that are configured to return a first portion of the liquid from the draw drum back to the vessel shell through the first and second spray headers as a wash oil, the draw drum being in fluid communication with the third spray header via a pumparound line that is configured to return a second portion of the liquid from the draw drum back to the vessel shell through the third spray header, and wherein the plurality of wash oil pipes and the pumparound line are in fluid communication with a fluid line that is fluidly coupled to the draw drum at a location higher than the draw line to receive the first and second portions of the liquid from the draw drum; and
      a plurality of particle filters configured to filter the portions first portion of the liquid from the draw drum prior to return to the vessel shell through the first and second spray headers.

2. The hydrocarbon distribution system of claim 1, and wherein the first polar orientation and the second polar orientation are selected to maximize coverage of spray patterns of the spray nozzles of the first spray header and the second spray header.

3. The hydrocarbon distribution system of claim 1, wherein the diameter of the plurality of wash oil pipes is intermittently reduced over the length thereof.

4. The hydrocarbon distribution system of claim 3, wherein the plurality of particle filters are fluidly coupled to the plurality of wash oil pipes.

5. The hydrocarbon distribution system of claim 4, wherein the plurality of particle filters are configured to filter particles with a radius larger than about d/4, where d is the free passage of the spray nozzles.

6. The hydrocarbon distribution system of claim 1, further comprising a vapor distribution tray disposed in the vessel shell below the wash zone, the vapor distribution tray being configured to radially distribute a vapor passing therethrough.

7. A hydrocarbon distribution system, comprising:
   a vessel shell, comprising:
      a vapor distribution tray configured to radially distribute a vapor passing therethrough;
      a wash zone disposed above the vapor distribution tray;
      a collector tray disposed above the wash zone;
      a packed pumparound bed disposed above the collector tray;
      a first spray header disposed in the wash zone at a first polar orientation about a central axis of the vessel shell; and
      a second spray header disposed in the wash zone at second polar orientation about the central axis of the vessel shell, each of the first spray header and the second spray header having a plurality of spray nozzles coupled thereto, the first and second spray headers configured to uniformly distribute wash oil across the wash zone; and
   a draw system, comprising:
      a draw drum in fluid communication with the vessel shell via a draw line that is configured to supply liquid collected in the collector tray to the draw drum, the draw drum being in fluid communication with the first and second spray headers via a plurality of wash oil pipes that are configured to return a first portion of the liquid from the draw drum back to the vessel shell through the first and second spray headers as a wash oil, and wherein the plurality of wash oil pipes are in fluid communication with a fluid line that is fluidly coupled to the draw drum at a location higher than the draw line to receive the portion of the liquid from the draw drum; and a plurality of particle filters configured to filter the portion of the liquid from the draw drum prior to returning the first portion of the liquid to the vessel shell through the first and second spray headers.

8. The hydrocarbon distribution system of claim 7, wherein the vapor distribution tray has an open flow area that is less than 20% of the flow area of the vessel shell.

9. The hydrocarbon distribution system of claim 7, wherein the vapor distribution tray has a sump disposed between a first sloped portion and a second sloped portion.

10. The hydrocarbon distribution system of claim 7, wherein a drain is formed in the vapor distribution tray, the drain positioned in the vapor distribution tray in an area that corresponds to a low velocity region of the vapor below the vapor distribution tray.

11. The hydrocarbon distribution system of claim 7, wherein a drain is formed in a sump of the vapor distribution tray, the drain having a sloped portion configured to form a dynamic liquid seal therein, such that the pressure created by the dynamic liquid seal prevents the vapor below the vapor distribution tray from rising through the drain to the wash zone.

12. The hydrocarbon distribution system of claim 7, further comprising a third spray header disposed in the vessel shell above the packed pumparound bed and having a plurality of spray nozzles coupled thereto, and wherein the draw drum is in fluid communication with the third spray header via a pumparound line that is configured to return a second portion of the liquid from the draw drum back to the vessel shell through the third spray header.

13. A hydrocarbon distribution system, comprising:
a vessel shell, comprising:
  a wash zone;
  a collector tray disposed above the wash zone;
  a first spray header disposed in the wash zone at a first polar orientation about a central axis of the vessel shell;
  a second spray header disposed in the wash zone at second polar orientation about the central axis of the vessel shell, each of the first spray header and the second spray header having a plurality of spray nozzles coupled thereto, the first and second spray headers configured to uniformly distribute wash oil across the wash zone; and
  a third spray header disposed above the first and second spray headers and having a plurality of spray nozzles coupled thereto; and
a draw system, comprising:
  a draw drum in fluid communication with the vessel shell via a draw line that is configured to supply liquid collected in the collector tray to the draw drum, the draw drum being in fluid communication with the first and second spray headers via a plurality of wash oil pipes that are configured to return a first portion of the liquid from the draw drum back to the vessel shell through the first and second spray headers as wash oil, the draw drum being in fluid communication with the third spray header via a pumparound line that is configured to return a second portion of the liquid from the draw drum back to the vessel shell through the third spray header, and wherein the plurality of wash oil pipes and the pumparound line are in fluid communication with a fluid line that is fluidly coupled to the draw drum at a location higher than the draw line to receive the portions of the liquid from the draw drum; and
  a plurality of particle filters configured to filter the first portion of the liquid from the draw drum prior to returning the first portion of the liquid to the vessel shell through the first and second spray headers.

14. The hydrocarbon distribution system of claim 13, further comprising a vapor distribution tray disposed in the vessel shell and configured to radially distribute a vapor passing therethrough, wherein the vapor distribution tray has an open flow area that is less than 20% of the flow area of the vessel shell.

15. The hydrocarbon distribution system of claim 13, wherein the diameter of the plurality of wash oil pipes is intermittently reduced over the length thereof.

16. The hydrocarbon distribution system of claim 14, wherein the vapor distribution tray has a sump disposed between a first sloped portion and a second sloped portion.

17. The hydrocarbon distribution system of claim 14, wherein a drain is formed in the vapor distribution tray, the drain positioned in the vapor distribution tray in an area that corresponds to a low velocity region of the vapor below the vapor distribution tray.

18. The hydrocarbon distribution system of claim 14, wherein a drain is formed in a sump of the vapor distribution tray, the drain having a sloped portion configured to form a dynamic liquid seal therein, such that the pressure created by the dynamic liquid seal prevents the vapor below the vapor distribution tray from rising through the drain to the wash zone.

19. The hydrocarbon distribution system of claim 13, wherein the first polar orientation and the second polar orientation are selected to maximize coverage of spray patterns of the spray nozzles of the first spray header and the second spray header.

20. The hydrocarbon distribution system of claim 13, further comprising a packed pumparound bed disposed in the vessel shell above the collector tray and below the third spray header.

* * * * *